US008433957B2

(12) United States Patent
Njo et al.

(10) Patent No.: US 8,433,957 B2
(45) Date of Patent: *Apr. 30, 2013

(54) METHOD AND SYSTEM FOR ERROR MANIPULATION

(75) Inventors: Angela M. Njo, Shelton, CT (US); Robert P. Sedor, Simsbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,131

(22) Filed: Apr. 9, 2012

(65) Prior Publication Data

US 2012/0198288 A1    Aug. 2, 2012

Related U.S. Application Data

(63) Continuation of application No. 10/742,094, filed on Dec. 19, 2003, now Pat. No. 8,156,387.

(51) Int. Cl.
*G06F 11/00*  (2006.01)

(52) U.S. Cl.
USPC ................................................................ 714/57

(58) Field of Classification Search ............... 714/57
See application file for complete search history.

(56) References Cited

U.S. PATENT DOCUMENTS

| | | | | |
|---|---|---|---|---|
| 5,315,508 A | * | 5/1994 | Bain et al. | 705/28 |
| 5,345,091 A | * | 9/1994 | Craig et al. | 235/462.15 |
| 5,497,450 A | | 3/1996 | Helmbold et al. | |
| 5,621,864 A | * | 4/1997 | Benade et al. | 358/1.18 |
| 6,220,509 B1 | * | 4/2001 | Byford | 235/375 |
| 6,525,835 B1 | * | 2/2003 | Gulati | 358/1.18 |
| 6,629,267 B1 | * | 9/2003 | Glerum et al. | 714/38.11 |
| 6,662,192 B1 | | 12/2003 | Rebane | |
| 6,662,357 B1 | * | 12/2003 | Bowman-Amuah | 717/120 |
| 6,785,848 B1 | * | 8/2004 | Glerum et al. | 714/38.11 |
| 6,883,118 B2 | * | 4/2005 | Morgan et al. | 714/43 |
| 6,892,330 B2 | * | 5/2005 | Lee | 714/48 |
| 7,062,681 B2 | * | 6/2006 | Larsson et al. | 714/39 |
| 7,596,792 B2 | * | 9/2009 | Chheda et al. | 719/318 |
| 8,156,387 B2 | * | 4/2012 | Njo et al. | 714/57 |
| 2002/0023955 A1 | * | 2/2002 | Frank et al. | 235/382 |
| 2002/0059310 A1 | * | 5/2002 | Choi | 707/200 |

(Continued)

FOREIGN PATENT DOCUMENTS

| | | |
|---|---|---|
| FR | 2582388 | 11/1986 |
| WO | WO02091130 | 11/2002 |
| WO | WO03012592 | 2/2003 |

*Primary Examiner* — Amine Riad

(74) *Attorney, Agent, or Firm* — George M. Macdonald; Charles R. Malandra, Jr.; Steven J. Shapiro

(57) ABSTRACT

A system and method for manipulation of event data, such as errors, in a networked environment. The method includes receiving event signal data indicative of an event, and associating descriptive data with the event signal data. The descriptive data is then mapped to one or more associated connections. A determination is made whether to post identifier data corresponding to the event signal data. This determination is made as a function of predetermined criteria. If a determination is made to post the identifier data, the particular identifier data is posted. The posted identifier data may be selectively retrieved and output in a specified format. The identifier data may be stored in a memory. Descriptive data may be accumulated for a plurality of events subsequent to the mapping step. An alert condition may be established based on the type of event that has occurred.

20 Claims, 2 Drawing Sheets

U.S. PATENT DOCUMENTS

| | | | |
|---|---|---|---|
| 2002/0133761 A1* | 9/2002 | Numano | 714/57 |
| 2003/0004830 A1* | 1/2003 | Frederick | 705/26 |
| 2003/0061007 A1* | 3/2003 | Sigl | 702/185 |
| 2005/0246593 A1* | 11/2005 | Littrell | 714/48 |
| 2008/0276137 A1* | 11/2008 | Lin et al. | 714/57 |
| 2011/0209010 A1* | 8/2011 | Morimura et al. | 714/57 |

* cited by examiner

METHOD AND SYSTEM FOR ERROR MANIPULATION

CROSS-REFERENCE TO RELATED APPLICATION

This application is a Continuation of commonly owned, co-pending patent application Ser. No. 10/742,094, filed Dec. 19, 2003, entitled Method and System for Error Manipulation by Njo, et al., which application is incorporated herein by reference in its entirety.

BACKGROUND OF THE INVENTION

1. Field of the Invention

The present invention relates generally to manipulating errors. More particularly, the present invention relates to determining which event data is desired to be accumulated by a particular location or user.

2. Background Discussion

An important use of computers is the transfer of information over a network. Currently, the largest computer network in existence is the Internet, which is a worldwide interconnection of computer networks that communicate using a common protocol. Millions of computers, from low-end personal computers to high-end super computers are coupled to the Internet.

The World-Wide-Web ("the Web") was introduced to the Internet in approximately 1989. The Web is a wide-area hypermedia information retrieval system aimed to give wide access to a large universe of documents.

The architecture of the Web follows a conventional client-server model. The terms "client" and "server" are used to refer to a computer's general role as a requester of data (the client) or provider of data (the server). Under the Web environment, Web browsers reside in clients and Web documents reside in servers. Web clients and Web servers typically communicate using a protocol called "Hypertext Transfer Protocol" (HTTP).

One type of data collection is described in U.S. Pat. No. 6,662,192, entitled, "System and Method for Data Collection, Evaluation, Information Generation, and Presentation", issued to Rebane. This relates to a system for collecting, evaluating, generating, and presenting data and/or information relating to electronic commerce. The system includes a module for stabilizing small or noisy samples of data; alarm modules that alert a handler when data values are anomalous or cross specified thresholds; predictor modules that use recent historical data along with an estimated and/or available saturation population function as the basis for a differential equation that predicts the future growth of the population to a maximum attainable level; and a dynamic measurement indicator that conveys to users of a system levels of predefined and ongoing activity occurring on another's system. The fields include e-commerce; information retrieval/analysis, and planning and control.

Another type of data collection is disclosed in U.S. Pat. No. 6,662,357, entitled, "Managing Information in an Integrated Development Architecture Framework" issued to Bownan-Amuah. This relates to a system for managing information in a development architecture framework. Common information that is used by a plurality of components of a system is allowed to be accessed in a single, shared repository. Unique information that is unique to the components of the system is stored in corresponding designated folders. Media content communicated in the system is managed based on metadata.

Current error handling systems are not designed to adequately discriminate between various types of events, such as errors in devices, or machines. For example, many current systems accumulate all events for a machine and provide the accumulated data to a user. This approach fails to consider the desires and particular needs of various users. It would be an advancement in the state of the art to have a more efficient manner to manipulate event data.

SUMMARY OF THE INVENTION

The present invention represents an advancement in the state of the art by providing a more efficient method and system for manipulating event data. This method and system enables event data to be advantageously filtered, or processed, such that a receiver or user of the data obtains tailored output.

Accordingly, one embodiment of the present invention is directed to a method for performing error manipulation that includes receiving event signal data indicative of an event, and associating descriptive data with the event signal data. The descriptive data is then mapped to one or more associated connections. A determination is made whether to post identifier data corresponding to the event signal data. This determination is made as a function of predetermined criteria. If a determination is made to post the identifier data, the particular identifier data is posted. The posted identifier data may be selectively retrieved and output in a specified format.

A further embodiment of the embodiment described above includes storing the identifier data in a memory subsequent to the determining step.

Yet a further embodiment of the embodiment described above includes accumulating descriptive data for a plurality of events subsequent to the mapping step.

Yet a further embodiment of the embodiment described above includes storing the accumulated descriptive data.

Yet a further embodiment of the embodiment described above includes establishing an alert condition as a function of the posted identifier data.

Yet a further embodiment of the embodiment described above includes outputting an alert indication signal.

Yet a further embodiment of the embodiment described above includes outputting the alert indication signal in human-readable form.

Yet a further embodiment of the embodiment described above includes transmitting the particular identifier data to a storage medium.

Yet a further embodiment of the embodiment described above includes transmitting particular identifier data to a system log location.

Yet a further embodiment of the embodiment described above includes transmitting particular identifier data in html format.

Yet a further embodiment of the embodiment described above includes transmitting particular identifier data as a function of the event signal data.

BRIEF DESCRIPTION OF THE DRAWINGS

Figure 1:
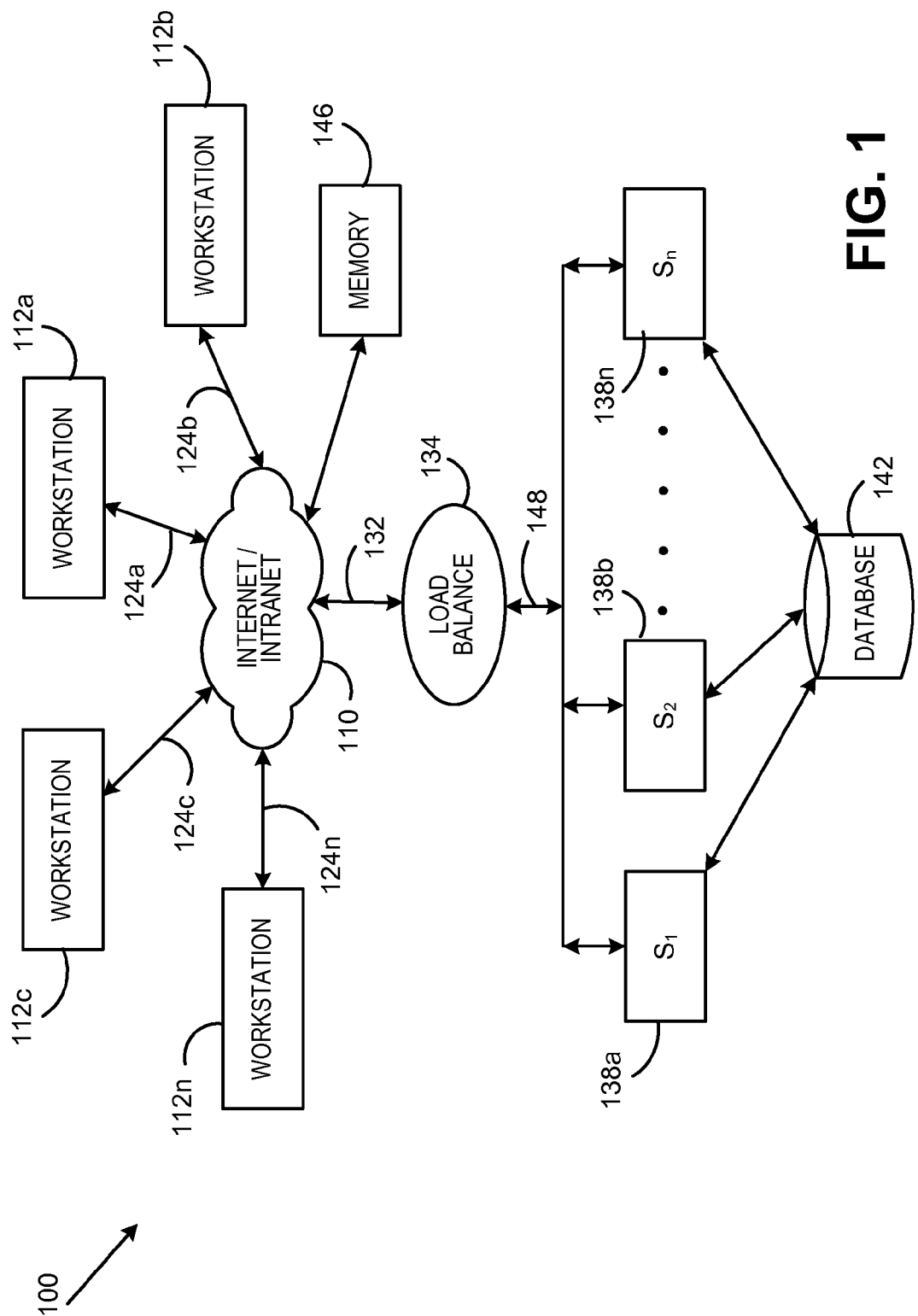

Having thus described the invention in general terms, reference will now be made to the accompanying drawings, which are not necessarily drawn to scale, and wherein:

FIG. 1 shows a block diagram of the system of the present invention.

Figure 2:
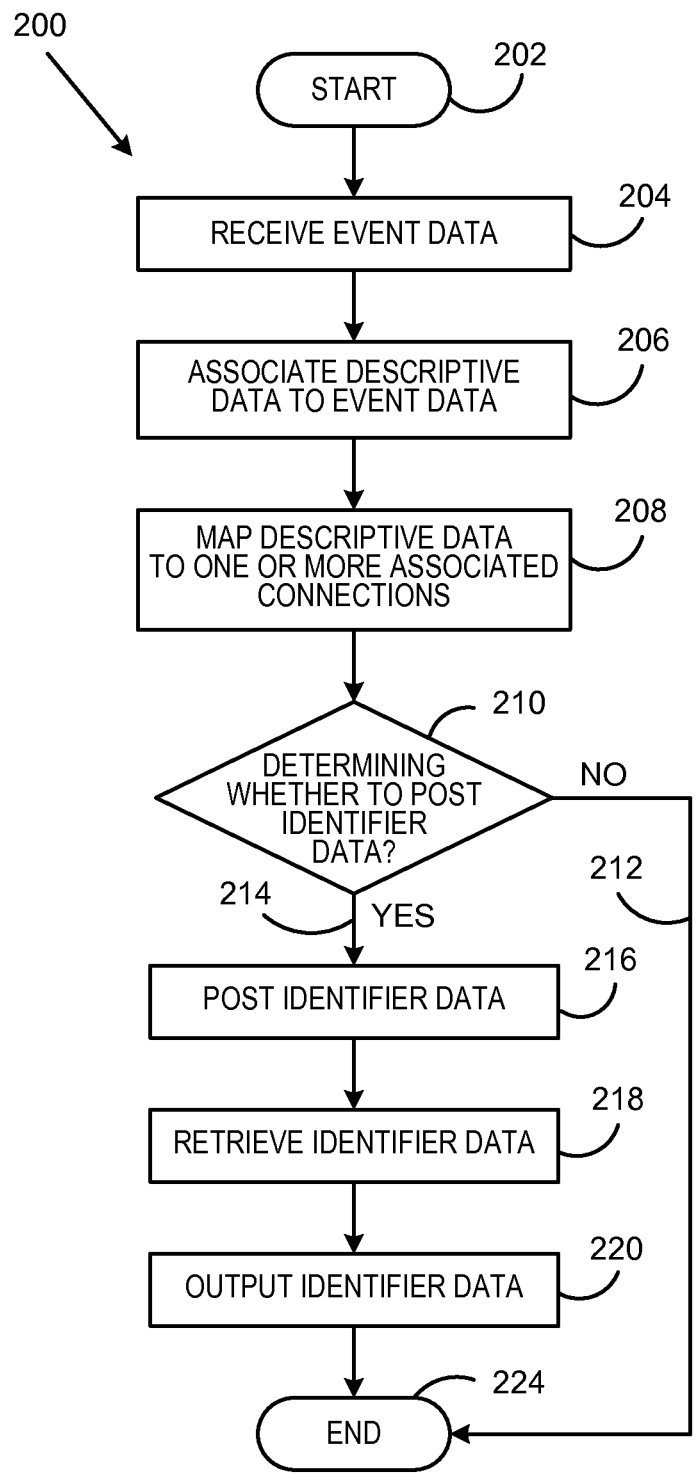

FIG. 2 shows a flowchart of steps to implement the present invention.

DETAILED DESCRIPTION OF THE INVENTION

The present invention will now be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. The present invention includes all foreseeable equivalents as well as the best mode for carrying out the invention. Like numbers refer to like elements throughout.

The present invention is directed to a method and system for performing error manipulation. The method includes receiving event signal data indicative of an event. The event is typically indicative of an operational state of a machine, which is typically a server. The event may be for example an error, a malfunction, an operational milestone for service, failure signal or other event.

The event data is associated with descriptive data. The descriptive data is, for example, machine identification number, serial number, information relating to the location of the machine or other information that describes the machine.

The descriptive data is then mapped to one or more associated connections. The connections include, for example, storage locations, transmission destinations and transmission formats, such as html and xml. A determination is made whether to post identifier data corresponding to the event signal data. The identifier data is a quantity that typically identifies a level of the event. For example, routine maintenance events could have a particular identifier, such as "1" while a failure event could have an identifier of "5" with other events of intermediate significance could have an indicator between 1 and 5. This determination is made as a function of predetermined criteria. For example, if the user is a test engineer, they may want to accumulate all event data, while an end-user may only want to accumulate identifiers that exceed "3".

Thus, depending on the audience, differing levels of identifiers are desired. If a determination is made to post the identifier data, the particular identifier data is posted. Posting involves transmitting and/or accumulating or logging the desired event data for use or analysis or record-keeping purposes.

Another embodiment of the present invention utilizes verbosity to ascertain those identifiers to be posted. The verbosity technique, for example, will post all identifiers up to a specified quantity. For example, when identifies are quantities 1-5, a verbosity level "3" will post all identifiers that are 1, 2 or 3. This verbosity technique, or any technique, for determining identifiers to post may be implemented by a program developer. This determination may also be modified over time. For example, an administrator, or operator, can manipulate the determining process to make it more or less inclusive such that during a development stage the identifiers posted are more broad and during production, the identifiers are more restrictive.

Another feature of the present invention is that the occurrence of an event is non-invasive and does not impact operation of the machine. Event signals, which are not catastrophic, are placed in a queue such that any processing activity proceeds without effecting the causality, or sequence of processing events.

The posted identifier data may be selectively retrieved and output in a specified format. The selective retrieval is a function of the desires of the user or operator. For example, an operator may have certain concerns about the operation of a machine and queries the log to obtain only the desired information. This presents more efficient results. Furthermore, the identifier data may be output in a specified format such as a particular language, machine-readable format, such as a barcode that can be scanned, encrypted format, or printed or electronic format.

The present invention provides an improved error handling system by utilizing a centralized error handling and logging facility. This facility, or module, may be at a server machine, or other suitable device with adequate memory and processing capacity. The error-handling framework running on the machine prevents and mitigates events, which may be adverse, or merely informational in nature, from escalating or occurring undetected. The invention permits propagation of the source and context of the error to the user, or caller or operator, for facilitating troubleshooting. The present system may be implemented with either C++ or VB (Visual Basic) components.

The present invention enables setting, or establishing parameters related to the system. Examples of these parameters include: physical machine name; process identification; error number; error description; object and method call; Dll version number; creation date; information about the event, such as arguments used.

The system of the present invention also has the capability to provide primary logging as well as one or more alternate methods for logging, or tracking. For example, if a database is inoperative, or not available (due to service or maintenance), or experiencing a temporary malfunction, then the data may be written to an event log and/or written to a flat file, and/or written to a message queue, or other operation, which may be able to be processed and placed in the database at a later time.

The present invention also supports globalization. This may be accomplished by providing a table of error number mapping and a related language setting. Furthermore, the present invention has the ability to set priority alert and email support indications, or send a network message. To provide notification of an alert, either the system can be programmed to send an electronic message, or an operator can send the electronic message.

An administrative file, or log may be generated to accumulate data. This file, or log may be output to a user interface, display, printer or other output means. Typically, the administrative log is in human readable format, although machine-readable output may also be generated. This includes one-dimensional and two-dimensional barcodes, encoded representations and/or encrypted representations.

Other features and characteristics of the present invention include defining the principle for error propagation. These definitions are suitably pre-established based on the particular application and the priorities of the user.

It is an embodiment of the present invention that the system, as described herein, can differentiate how the type of error should be handled (e.g. web services vs. a regular server environment). There may also be a difference if the process in a transaction is in MTS/COM, and there are different error classes for different purposes. The classes range from simple to more complex and are typically weighed against performance trade-offs.

Another feature of the present invention is to provide functionality to determine when to discard error data in the database, file, and/or message queue, and instances in which the error data should be maintained. Furthermore, the present invention provides tracing capability to be enabled programmatically for released software. This is particularly useful during unit testing process. Various types of information may be passed without using specific types of data types. For example, xml (extreme mark-up language) is one possible solution. This would be useful as in a manifest, or "End of Day" process where the information is passed between various components.

Integration of other performance indicators may be accomplished by utilizing, for example window monitoring instrumentation, system events, and the like.

The tracing feature includes, for example source information (i.e., machine, time, project, class, and method) and environment information (i.e., security context, process identification, thread identification). The present invention also has the ability to facilitate error communication between components via events used by subscribers. This may be accomplished by broadcast the calls to subscribers, or users. There may also be cross-communication between components of the system.

Once an event has been detected, descriptive data, such as machine identification, such as serial number, location, or other information can be associated with the event data. Events may be for example, malfunctions, maintenance milestones, length of operation milestones, power failure, processor failure, or any operational state that impacts the operation of the machine. Using a COM+ event class, the event can be logged in a memory or directory. Users can create and invoke the log directly.

One specific example of logging steps is as follows.
1. Trace the calling tree (the causality) from the original client down to the lowest components, across threads, processes, and machines—tracing the logical thread of execution.
2. Log the call's/event's/error's time and location.
3. Interleave all the calls from all applications into one log file.
4. Log the current COM+ execution context.
5. Allow administrative customization to determine what is logged—for example: just errors, or events and errors.
6. Allow administrative customization of the log filename.
7. Save log data in three formats: HTML, XML, or db tables.
8. Have a different lifeline for the logging application and the applications using it. Example: Use of persistent subscriptions.
9. Be able to toggle logging on or off.

Examples of logged data include:
HRESULT
ErrorCode
ProcessId
ThreadId
ActivityId
TransactionId
ContextId
MachineName
SourceFileName
ModuleName
MethodName
LineNumber
Description Examples of tracing include:
TraceMethod—Traces a method into the log
TraceError—Traces an error into the log
TraceEvent—Traces and event into the log
TraceError_and_Return—Traces an error into the log and returns in case of an error, or continues to run if no error has occurred.

The present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code embodied in the storage medium. More particularly, the present invention may take the form of web-implemented computer software. Any suitable computer-readable storage medium that is arranged to provide instructions to a computer or processor for execution may be suitable. Such a medium may take many forms, including but not limited to, non-volatile media, volatile media, and transmission media. Non-volatile media include, for example, optical or magnetic disks. Volatile media include dynamic memory, such as a computer's main memory.

Transmission media and transmission means include coaxial cables, copper wire and fiber optics. Transmission media can also take the form of acoustic or light waves, such as those generated during radio frequency (RF) and infrared (IR) data communications. Examples of common forms of computer-readable media include a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The present invention is described below with reference to block diagrams and flowchart illustrations of systems, methods, apparatuses and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

FIG. 1 shows a block diagram 100 of the system of the present invention. The system includes a plurality of client stations 112(*a*), 112(*b*) . . . 112(*n*), where n is any suitable number, a network 110, a load balancing module 134 and a plurality of machines 138(*a*), 138(*b*) . . . 138(*n*), where n is any number.

The client station 112(*a*) is operatively coupled, via an associated browser 124(*a*), 124(*b*) . . . (*n*) to network 110, which may be for example, a network of interrelated computers, operatively coupled processors, intranet or Internet. This coupling between the client station, generally 112 and the network 110, enables data to be transmitted from the network/Internet 110 to the client stations 112.

The client station 112 has storage and processing capabilities as well as data transmission and reception abilities. The client station 112 typically comprises, for example, a processor, which is typically, for example, an Intel® Pentium® 4 processor at 2 GHz with a 533 MHz front side bus and 512 K L2 cache and a 60 GB hard drive. The client station 112 may also include, or be coupled to a printer, such as a thermal or laser printer that is capable of printing one-dimensional barcodes, two dimensional barcodes, graphics, labels and text. The printed labels may be affixed to a letter, parcel, package or other article.

The client station 112 is operatively coupled by an associated browser generally 124, to the network or Internet 110. This coupling enables data to be transmitted from the network/Internet 110 to the client station 112.

The network/Internet 110 is coupled to a remote storage or memory 146 as well as a server side via a bi-directional communication link, or browser, 132. Link 132 connects network 110 to a load balancing module, or facility, 134.

The load balancing module, or facility, 134 is coupled, via bi-directional communication link, or bus, 148 to a plurality of machines, or devices, 138(a), 138(b) . . . 138(n), where n is any suitable number. Each machine, generally 138, is bi-directionally coupled to database 142. The machines, or devices, 138 are typically servers, with sufficient memory and processing power and speed to meet the requirements of system 100. The machines 138 also have input and output ports to receive and transmit data.

The machines 138 are capable of having parameters established for obtaining and processing event data. Event data includes operational states that include for example, malfunctions, errors, failures, and catastrophic failures.

The machines 138 may also be set to provide descriptive data, such as serial number of the machine, hours of operation since last service, type of job that machine was performing when the event occurred, maintenance requirements, The machines 138 can also be set to provide identifier data, such as the type of event that occurred, a level of response required to correct the event. Based on the "audience" i.e., the type of users or programmers, the machines 138 can determine whether to post identifier data for a particular event. For example, if the user, or audience is a tester, the level of posting may be very detailed; all events are posted to a connection, such as a database, a PC, a display, a memory, html (hypertext mark-up language) file or other desired location or destination.

Once the event identification data, as well as any other data, such as descriptive data, alert data or the like has been posted, a user or the system 100 can selectively retrieved desired information or portions of the information. The data, such as identifier data, may also be output to a user-interface, memory, accumulator log, html location, printed in a barcode format, printed in human-readable format or used to trigger an alert condition.

FIG. 2 shows a flowchart 200 of steps to implement the present invention. Block 202 is a start block. Block 204 shows that event data is received at a processing location. The event data may include any level of activity that has been established to be recorded or noted.

Block 206 shows that descriptive data is associated with the event data. Descriptive data typically includes machine serial number, machine identification code, location of machine, or any data that identifies the machine generating the event data.

Block 208 shows that the descriptive data is mapped, or associated, with one or more connections. Connections include destinations such as a memory or storage location, an html location, an xml location, a remote location, an output port, an output device, a printer, a display, a GUI or other transmission destination.

Decision block 210 shows that a determination is made whether to post the identifier data. The term "post", as used herein means to transmit, store, process, log or otherwise use the data.

Line 212 is reached if the identifier data is not posted. Line 212 shows that the process then goes to end block 224.

Line 214 is reached if the identifier data is posted. Line 214 leads to block 216 that shows the identifier data is posted. This step may include, for example, storing the identifier data in a local memory, storing the identifier data in a remote memory, transmitting the identifier data in html format, transmitting the identifier data to a remote terminal, accumulating identifier data in a log or manifest or other processing function.

Block 218 shows that the identifier data is retrieved. This retrieval process may be implemented by searching a database using key words, or downloading the identifier data.

Block 220 shows that the identifier data may be output, either to a remote location or to a display terminal. The output may also include alert signals or indicators that indicate items need attention.

Block 224 is an end block.

As used herein the term module, or facility, includes any software or hardware component that may be used alone or in conjunction with other modules or facilities. The transmission and reception of data from one module, or facility, to another module, or facility, is described in terms of communication.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention is described in terms of exemplary embodiments. The present invention has many equivalents for the structural elements described.

The description of the invention describes the invention in terms of a method and apparatus for carrying out the invention. As stated herein, the steps may be hardwired or stored on a computer-readable medium. The structure for implementing the present invention may be described in terms of modules or facilities. Such modules or facilities are suitably part of the processor found in the machines 138. These modules may be described in terms of their functionality. For example, the means for receiving event signal data include data ports, data entry modules, links, transmission input modules, and other modules or facilities arranged to obtain data for an apparatus, electronic medium or device. This functionality may be performed by a processing module of the machine 138 or as a part of a module of machine 138 or as a stand-alone unit operatively coupled to machine 138.

Means for associating descriptive data includes, for example, a mapping function, either hardwired, or software, or application specific integrated circuit, or look-up table or memory location. This functionality may be performed by a processing module of the machine 138 or as a part of a module of machine 138 or as a stand-alone unit operatively coupled to machine 138.

Means for mapping the descriptive data includes a mapping function, look-up table, or correlation function. Connections, as used herein, include a location or destination, such as a memory location, database, electronic storage medium, html transmission, xml (extreme mark-up language) transmission, processor location, computing device, such as a PC (personal computer), PDA (personal digital assistant) or other hand-held processing apparatus. This functionality may be performed by a processing module of the machine 138 or as a part of a module of machine 138 or as a stand-alone unit operatively coupled to machine 138.

Means for determining whether to post identifier data includes program code that is either hardwired or software or firmware, or one or more parameters that define a level associated with the identifier data. These parameters may be pre-established or modified at a specified time, or time interval. This functionality may be performed by a processing module of the machine 138 or as a part of a module of machine 138 or as a stand-alone unit operatively coupled to machine 138.

Means for posting includes a transmission port for transmitting data to a second location, which may be either remote or proximate. The means for posting may also include a link for operatively coupling the machine to another location, for example a memory, a storage, or an output device, such as a display or printer device. The means for posting may also include a data transmission medium arranged to transmit data. This functionality may be performed by a processing module of the machine 138 or as a part of a module of machine 138 or as a stand-alone unit operatively coupled to machine 138.

Means for selectively retrieving includes a memory that can be queried, or retrieval apparatus to retrieve data from a memory or storage location. This functionality may be performed by a processing module of the machine 138 or as a part of a module of machine 138 or as a stand-alone unit operatively coupled to machine 138.

Means for outputting includes an output device such as a PC, display, monitor, LCD module, printer, graphical user-interface (GUI), indicator device, audible signal generator, or other device that provides data to a user, operator or second destination. This functionality may be performed by a processing module of the machine 138 or as a part of a module of machine 138 or as a stand-alone unit operatively coupled to machine 138.

Means for storing includes a memory, cache, ROM, RAM, EEPROM, DRAM, floppy disk and any suitable electronic storage medium. This functionality may be performed by a processing module of the machine 138 or as a part of a module of machine 138 or as a stand-alone unit operatively coupled to machine 138.

Means for accumulating includes a database, memory, log, accumulating register, or any suitable electronic storage medium that stores more than one entry. This functionality may be performed by a processing module of the machine 138 or as a part of a module of machine 138 or as a stand-alone unit operatively coupled to machine 138.

Means for establishing an alert condition includes triggering a flag, toggle device or threshold indicator. This functionality may be performed by a processing module of the machine 138 or as a part of a module of machine 138 or as a stand-alone unit operatively coupled to machine 138.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for performing error manipulation comprising:
   receiving event signal data indicative of an event;
   determining if the event signal data corresponds to a first level corresponding to a first event signal category and determining if the event signal data corresponds to a second level corresponding to a second event signal category;
   determining whether to post identifier data corresponding to the event signal data as a function of predetermined criteria that identifies a selected posting level from the first and second levels; and
   posting particular data corresponding to the event signal data only if the event signal data corresponds to the at least one selected posting level.

2. The method as claimed in claim 1, wherein data corresponding to the event signal data includes identifier data, further comprising:
   storing the identifier data in a memory subsequent to the determining step;
   then retrieving the identifier data from the memory; and
   outputting the identifier data.

3. The method as claimed in claim 1, further comprising:
   associating descriptive data with the event signal data;
   mapping the descriptive data to one or more associated connections; and
   accumulating descriptive data for a plurality of events subsequent to the mapping step.

4. The method as claimed in claim 3, further comprising:
   storing the accumulated descriptive data.

5. The method as claimed in claim 1, further comprising:
   establishing an alert condition as a function of the posted data; and
   outputting an alert indication signal, wherein the alert indication signal is output in human-readable form.

6. The method of claim 1, wherein data corresponding to the event signal data includes identifier data, further comprising:
   selectively retrieving posted identifier data; and
   outputting the identifier data in a specified format.

7. The method as claimed in claim 1, further comprising:
   the at least two levels correspond to event severity classifications.

8. The method as claimed in claim 1, wherein data corresponding to the event signal data includes identifier data and wherein the posting step further comprises:
   transmitting the particular identifier data to one of a location selected from a group consisting of a storage medium and a system log location; and
   transmitting the particular identifier data in html format.

9. The method as claimed in claim 1, further comprising:
   transmitting particular data corresponding to the event signal data as a function of the event signal data.

10. The method of claim 1, wherein:
    the selected level is determined using a classification associated with a user.

11. The method of claim 10, wherein:
    the user classification is one of a end-user, a test engineer and a programmer.

12. The method of claim 1, wherein:
    the selected level is changed according to a development stage indicator associated with a system providing the event data.

13. The method of claim 1, wherein data corresponding to the event signal data includes identifier data, further comprising:
   posting the identifier data to a secondary location if a primary location is not available.

14. An apparatus for performing error manipulation comprising:
   means for receiving event signal data indicative of an event;
   means for determining if the event signal data corresponds to a first level corresponding to a first event signal category and determining if the event signal data corresponds to a second level corresponding to a second event signal category;
   means for determining whether to post identifier data corresponding to the event signal data as a function of predetermined criteria that identifies a selected posting level from the first and second levels; and
   means for posting particular data corresponding to the event signal data only if the event signal data corresponds to the at least one selected posting level.

15. The apparatus as claimed in claim 14, further comprising:
   means for associating descriptive data with the event signal data;
   means for mapping the descriptive data to one or more associated connections; and
   means for accumulating descriptive data for a plurality of events.

16. The apparatus as claimed in claim 14, further comprising:
   establishing an alert condition as a function of the posted data; and
   outputting an alert indication signal, wherein the alert indication signal is output in human-readable form.

17. The apparatus as claimed in claim 14, wherein data corresponding to the event signal data includes identifier data, further comprising:
   selectively retrieving posted identifier data; and
   outputting the identifier data in a specified format.

18. The apparatus as claimed in claim 14, wherein,
   the at least two levels correspond to event severity classifications, further comprising:
   transmitting particular data corresponding to the event signal data as a function of the event signal data.

19. The apparatus as claimed in claim 14, wherein:
   the selected level is determined using a classification associated with a user.

20. The apparatus as claimed in claim 14, wherein:
   the selected level is changed according to a development stage indicator associated with a system providing the event data.

* * * * *